Sept. 2, 1952  L. F. BORDA ET AL  2,609,477
APPARATUS FOR VULCANIZING A REPAIR AREA OF A PNEUMATIC TIRE
Filed Feb. 18, 1948  3 Sheets-Sheet 1
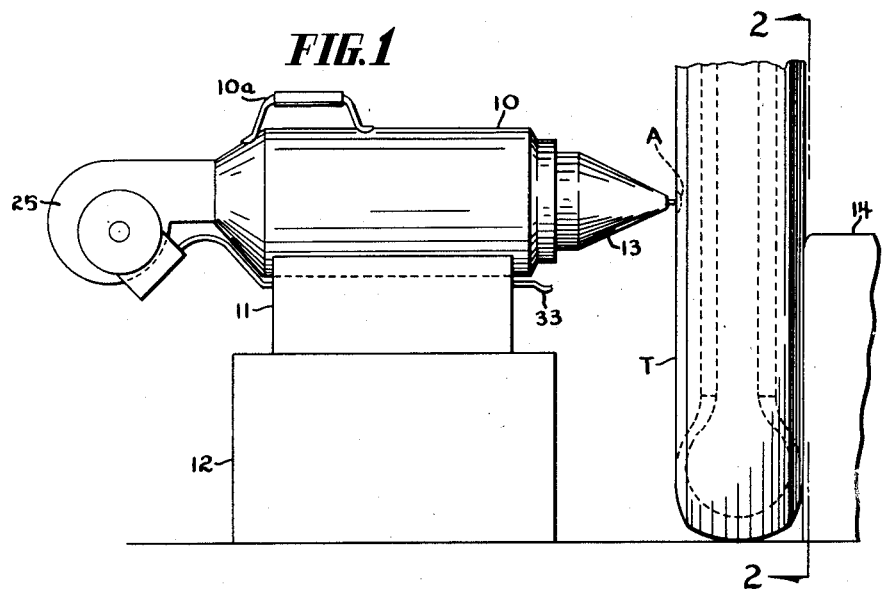
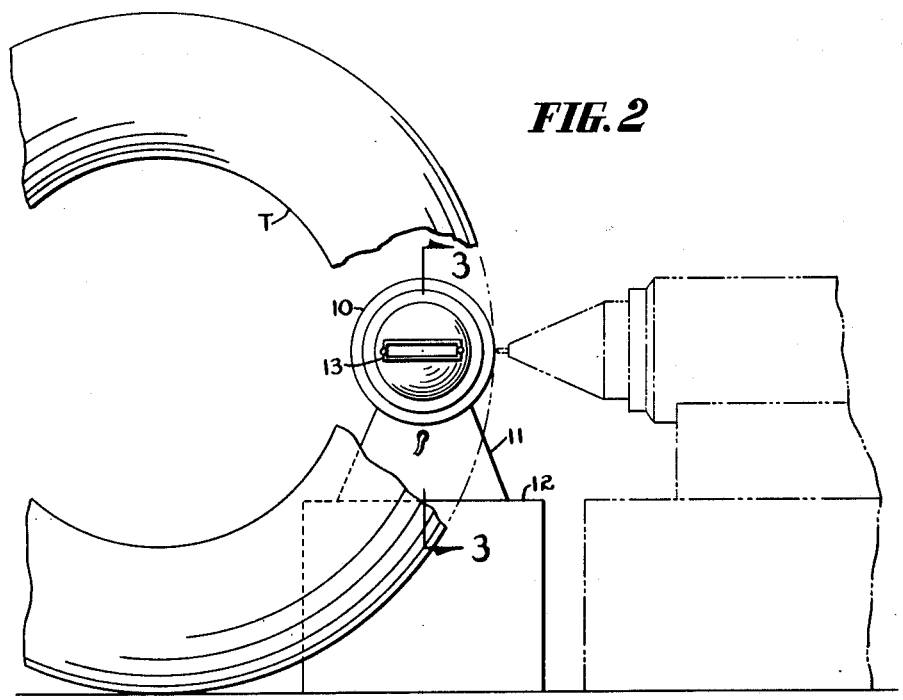
INVENTOR.
LADDY F. BORDA
BY SHELDON W. BILE
William Cleland
Attorney

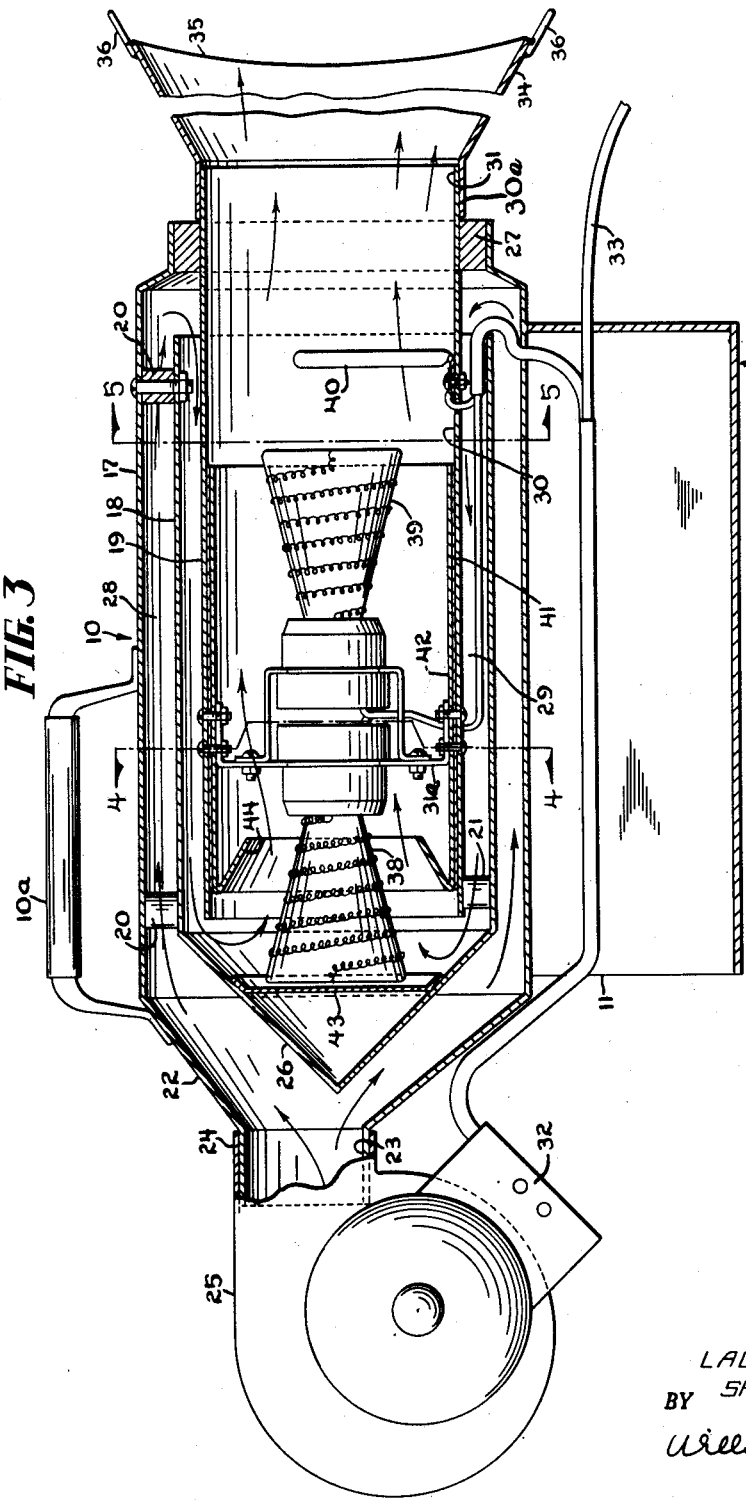

Sept. 2, 1952    L. F. BORDA ET AL    2,609,477
APPARATUS FOR VULCANIZING A REPAIR AREA OF A PNEUMATIC TIRE
Filed Feb. 18, 1948    3 Sheets-Sheet 3

INVENTOR.
LADDY F. BORDA
SHELDON W. BILE
BY William Cleland
Attorney

Patented Sept. 2, 1952

2,609,477

UNITED STATES PATENT OFFICE 2,609,477

APPARATUS FOR VULCANIZING A REPAIR AREA OF A PNEUMATIC TIRE

Laddy F. Borda, Akron, and Sheldon W. Bile, Barberton, Ohio

Application February 18, 1948, Serial No. 9,286

10 Claims. (Cl. 219—39)

1

This invention relates to apparatus particularly for vulcanizing rubber to a repair area of a pneumatic tire.

The invention is an improvement over prior application, Serial Number 656,668, filed March 23, 1946.

A particular object of the invention is to provide a simple, compact, and easily handled unit for vulcanizing repair patches of rubber to pneumatic tires, wherein is provided means for supplying air to the repair area of the tire at uniform predetermined vulcanizing temperature.

Another object of the invention is to provide a device of the character described wherein the air constituting the medium for conducting heat to the repair area serves additional functions of helping to maintain uniform vulcanizing temperature, and of maintaining the outer portions of the device cool, and therefore safe for handling by an operator.

Another object of the invention is to provide in a vulcanizing device of the character described, improved means for gauging a correct vulcanizing distance of an air outlet orifice thereof from the work.

Still another object of the invention is to provide a unitary device of the character described which with use of a minimum of special supporting structure is conveniently adjustable to working position with respect to substantially any relatively small area of a pneumatic tire casing, for example, for a repair vulcanizing operation thereon.

These and other objects of the invention will be manifest from the following brief description and the accompanying drawings.

Of the accompanying drawings:

Figure 1 is a side elevational view of a repair vulcanizer, embodying the features of the invention, the same being illustrated in association with the side of a pneumatic tire casing for a repair vulcanizing operation thereon.

Figure 2 is a view, partly broken away, taken substantially on the line 2—2 of Figure 1, another operating position of the vulcanizer being shown in chain-dotted lines.

Figure 3 is a longitudinal cross-section, partly broken away, through the vulcanizer, and taken substantially on the line 3—3 of Figure 2.

2

Figure 6:
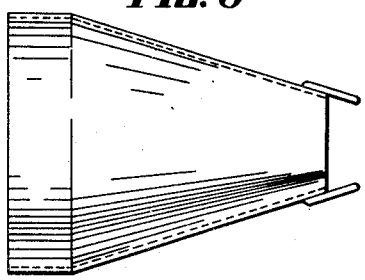
Figure 6 is a detail side elevational view of an interchangeable nozzle for the vulcanizer.
Figure 7:
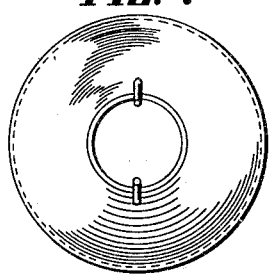

Figure 7 is an end view as viewed from the right of Figure 6.

Figure 8:
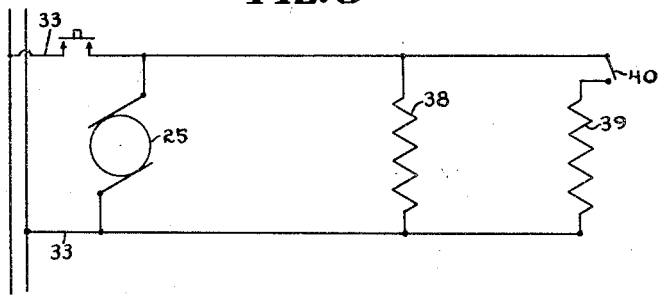

Figure 8 is a simple wiring diagram of the electrical connections in the vulcanizer.

Referring particularly to Figures 1 and 2 of the drawings, the numeral 10 designates a portable repair vulcanizing unit, supported in horizontal position by a flat-bottomed base 11 thereof, upon box 12 or other convenient structure to present a nozzle 13 at one end of the vulcanizer in association with the side wall of a pneumatic tire T, the latter being supported in vertical position against another convenient structure 14, as shown. A handle 10a is provided on top of casing 10 for carrying or adjusting the unit.

Figure 4:
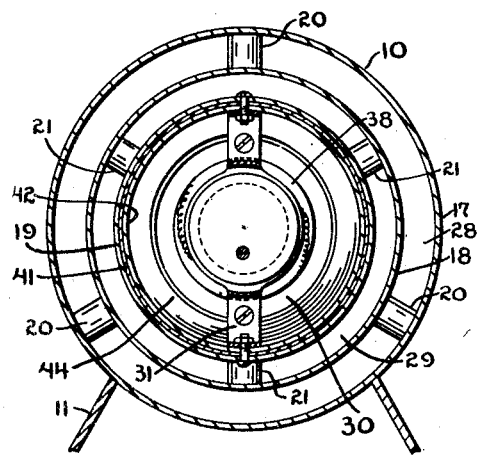
Figure 4 is a transverse cross-section, partly broken away, taken substantially on the line 4—4 of Figure 3.
Figure 5:
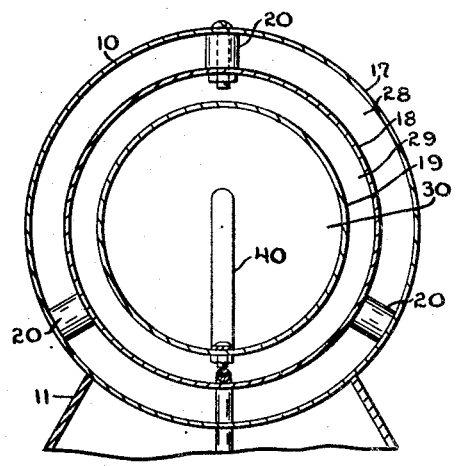
Figure 5 is a similar cross-section taken substantially on the line 5—5 of Figure 3.

Referring now to Figures 3, 4 and 5, the vulcanizing unit 10 includes a metal casing comprising concentric outer, inner, and intermediate cylindrical shells 17, 18 and 19, respectively, rigidly secured together in radially spaced relation by means of suitable spacers 20, 20 and 21, 21. One end of the outer shell 17 tapers at 22 to a cylindrical neck 23, to which is attached an outlet conduit 24 of an electrically operated air-blower 25. The corresponding end of the intermediate shell 18 is closed by a conical portion 26, to provide a conical face spaced from the conical wall 22 to direct forced air from blower 25 between the outer and intermediate shells. The opposite end of the outer shell has a ring 27 between the same and inner shell 19, to connect the chamber 28, defined by the space between the outer and intermediate shells, with a chamber 29, defined by the space between the intermediate and inner shells, and thereby to direct said air from chamber 28 back in the direction of the blower end. The inner end of the inner shell 19 terminates short of the conical portion 26, and air from intermediate chamber 29 will thereby be deflected reversely into a central longitudinally extending chamber 30, and outwardly through an air-outlet opening 31 at said opposite end of the inner shell. Conical portion 22 is shown in eccentric relation to conical portion 26 to assure proper mixing of the air in the spiral passageway provided by the connecting chambers as described.

The outlet end of inner shell 19 may be extended beyond the ring 27, for sliding reception thereon of a reduced neck 30a on a nozzle 34, which terminates in an orifice 35 of suitable size and shape. The nozzle 34 is replaceable by other nozzles the orifices of which have mouths of different sizes and shapes, as for example, round, as shown in Figures 6 and 7, or otherwise according to the size and shape of the repair area on a tire T to be vulcanized. Pins or projections 36, 36 are provided on the nozzle at opposite, widely spaced side portions of the mouth 35 thereof, for engaging the face of the tire T, and thereby maintaining the said mouth at a predetermined distance from the repair area, as indicated at A in Figure 1. This arrangement is such that the flow area at the mouth of the nozzle may be approximately two inches smaller all around than the area of a patch to be vulcanized.

For heating the air received from blower 25, a pair of electrical heating elements 38 and 39 is mounted longitudinally in tandem within the central chamber 30, by means of a suitable bracket 31a. Both the heating elements and the blower are controlled by manually operable switch means 32 mounted on the blower casing, the same being connected to a suitable source of electrical current through conduit means 33. As best shown in Figure 8, the wiring may be arranged so that the innermost heater element 38 will remain constantly energized while the outer element 39 is energized intermittently by a thermostat 40 mounted in shell 19 to extend toward the center of central chamber 30, at a point intermediate the heater element 39 and the outer end of said central chamber. This location of the thermostat is effective to maintain the air from blower 25 at a desired uniform vulcanizing temperature at the mouth 35 of nozzle 34.

In order to prevent heat conducted through the inner shell 19 from affecting the accuracy of the thermostat 40, said shell 19 is lined with heat-insulating material 41, such as asbestos sheeting. Accuracy of the thermostatic control is further enhanced by provision of a lining 42 of heat-reflecting metal in the shell 19, applied over the asbestos layer and surrounding the heating elements 38 and 39, but not extending toward contact with any part of the thermostat. The inner end of metal liner 42 is inturned to provide a conical deflector 44 which, in conjunction with a plate 43 secured to the conical part 26 of intermediate shell 18, is effective to direct the air emanating from the inner end of chamber 29 onto the constantly heated element 38.

In operation or use of the improved device, as for vulcanizing a relatively small repair area A on a vertically supported pneumatic tire T (see Figures 1 and 2), the operator, after pre-heating a patch of unvulcanized rubber or other elastomer and pressing it into a previously prepared depression cut into the rubber and/or fabric of the tire, places the unit on a box 12 or other structure of convenient height to position the mouth 35 of nozzle 34 in centered relation to the patch. With this arrangement any part of the tire T may be reached by rotating the same and moving the support 12 with the vulcanizer unit thereon, as best understood by reference to the full-line and chain-dotted positions of Figure 2. The vulcanizer is thus positioned with the pins 36 engaging the face of the tire, thereby to space said mouth of the nozzle for correct application of vulcanizing heat, which should be approximately 280° F., although this temperature may vary according to the materials used and other conditions. Thus air from blower 25 heated by the electrical heating elements to correct vulcanizing temperature, as controlled by thermostat 40, may be directed onto the rubber patch at A for a requisite length of time to complete vulcanization thereof to the tire T. It has been found, for example, that complete vulcanization of the rubber patch may be effected by application of continuous heat for from ten to fifteen minutes, during which time the hot plastic rubber may be smoothed over by means of a knife or other flat tool. This operation obviates the necessity of subsequent buffing operations to remove excess rubber or irregularities. At this stage, also, a suitable tool may be used to mold or form the hot rubber to desired configuration, as of a portion of tread design or insignia.

The spiral passage of the air from the blower, through the chambers 28 and 29 to the central chamber 30, is effective to prevent loss of heat outwardly through the vulcanizer casing, as well as to maintain the outer portions of said casing at relatively cool temperature for safe handling of the unit by the operator.

Modifications of the invention may be resorted to without departing from the spirit thereof or the scope of the appended claims.

What is claimed is:

1. Apparatus for treating an area of rubber or like thermo-plastic material on a pneumatic tire or other structure, comprising a casing having an orifice therein, the flow area at the mouth of said orifice approximating at least the size of said area to be treated, means for forcing air into said casing and outwardly through said orifice, heater means in said casing for heating said air to a predetermined uniform treating temperature, and spaced projections extending longitudinally from said casing for engagement with the work area to be treated to space the mouth of said orifice a predetermined uniform distance from said area to be treated.

2. Apparatus for uniformly treating an area of an object with heat, comprising a casing having an air-outlet orifice at one end and means at the other end thereof for forcing air therethrough, said casing having a central longitudinally extending chamber and a series of concentric outer chambers the outermost of which communicates with said air forcing means, said outer chambers communicating with each other and the innermost thereof communicating with said central chamber at said other end of the casing, whereby the forced air will pass through the central chamber and through the mouth of said orifice, heating means in said central chamber for heating said air as it passes therethrough, a nozzle, means for attaching said nozzle to said orifice end of said casing, said orifice being in said nozzle and having a flow of predetermined area proportionate to the size of the area to be treated, and a plurality of spaced projections extending longitudinally from said nozzle for engaging said object area to maintain the end of said nozzle a predeterminately uniformly spaced distance from said object area.

3. Apparatus for treating an area of rubber or like elastomer on a pneumatic tire or similar object, comprising a casing having an outlet orifice at one end and a source of forced air at the other end thereof, said outlet orifice being relatively large whereby said air will emanate therefrom substantially unrestrictedly, electrical heating means in said casing for heating said air, and a thermostat in said casing for regulating said heating means to maintain the air emanating from the orifice at predetermined treating temperature.

4. Apparatus for treating an area of rubber or like elastomer on a pneumatic tire or similar object, comprising a casing having an outlet orifice at one end and a source of forced air at the other end thereof, said outlet orifice being relatively large whereby said air will emanate therefrom substantially unrestrictedly, electrical heating means in said casing for heating said air, and a thermostat in said casing for regulating said heating means to maintain the air emanating from the orifice at predetermined treating temperatures, said heating means comprising a plurality of heating elements, at least one of which is maintained at constant heat and at least one of which is regulated by said thermostat.

5. Apparatus as set forth in claim 3, including a lining heat-reflecting material within said casing and surrounding said heating means.

6. Apparatus for treating an area of rubber or like elastomer on a pneumatic tire or similar object, comprising a casing having an outlet orifice at one end and a source of forced air at the other end thereof, a flat-bottomed base on said casing for supporting the same on a surface, electrical heating means in said casing for heating said air, and a thermostat in said casing for regulating said heating means to maintain the air emanating from the orifice at predetermined treating temperature.

7. Apparatus for vulcanizing an area of rubber or like elastomer on a pneumatic tire or other object, comprising a casing having a central chamber and a series of concentric outer chambers extending longitudinally of the casing and substantially unrestrictedly interconnected to provide an inwardly spirally winding passage from an inlet end to said inner chamber, said casing having an air outlet from said central chamber, a source of forced air connected to said casing at the inlet end of said passage, electrical heating means in said central chamber for heating said air as it passes therethrough, a nozzle having an air outlet orifice, means for releasably attaching said nozzle to said casing in cooperation with said air outlet, said nozzle outlet orifice having a flow of predetermined area approximating the size of area to be treated, said electrical heating means including a plurality of heating elements arranged in tandem in the direction of said outlet orifice, including a thermostat mounted in said central chamber intermediate said heating means and said outlet orifice.

8. Apparatus for vulcanizing an area of rubber or like elastomer on a pneumatic tire or other object, comprising a casing having a central chamber and a series of concentric outer chambers extending longitudinally of the casing and substantially unrestrictedly interconnected to provide an inwardly spirally winding passage from an inlet end to said inner chamber, said casing having an air outlet from said central chamber, a source of forced air connected to said casing at the inlet end of said passage, electrical heating means in said central chamber for heating said air as it passes therethrough, a nozzle having an air outlet orifice, means for releasably attaching said nozzle to said casing in cooperation with said air outlet, said nozzle outlet orifice having a flow of predetermined area approximating the size of area to be treated, said electrical heating means including a plurality of heating elements arranged in tandem in the direction of said outlet orifice, including a thermostat mounted in said central chamber intermediate said heating means and said outlet orifice, said thermostat having a make-and-break connection with a heating element outermost with respect to the outlet orifice.

9. Apparatus for vulcanizing an area of rubber or like elastomer on a pneumatic tire or other object, comprising a casing having a central chamber and a series of concentric outer chambers extending longitudinally of the casing and substantially unrestrictedly interconnected to provide an inwardly spirally winding passage from an inlet end to said inner chamber, said casing having an air outlet from said central chamber, a source of forced air connected to said casing at the inlet end of said passage, electrical heating means in said central chamber for heating said air as it passes therethrough, a nozzle having an air outlet orifice, means for releasably attaching said nozzle to said casing in cooperation with said air outlet, said nozzle outlet orifice having a flow of predetermined area approximating the size of area to be treated, said electrical heating means including a plurality of heating elements arranged in tandem in the direction of said outlet orifice, including a thermostat mounted in said central chamber intermediate said heating means and said outlet orifice, said thermostat having a make-and-break connection with a heating element outermost with respect to the outlet orifice, said nozzle having a plurality of projections for engaging a face of the object being treated to maintain the nozzle at a predetermined distance from said object.

10. Apparatus for vulcanizing an area of rubber or like elastomer on a pneumatic tire or other object, comprising a casing having a central chamber and a series of concentric outer chambers extending longitudinally of the casing and substantially unrestrictedly interconnected to provide an inwardly spirally winding passage from an inlet end to said inner chamber, said casing having an air outlet from said central chamber, a source of forced air connected to said casing at the inlet end of said passage, electrical heating means in said central chamber for heating said air as it passes therethrough, a nozzle having an air outlet orifice, means for releasably attaching said nozzle to said casing in cooperation with said air outlet, said nozzle outlet orifice having a flow of predetermined area approximating the size of area to be treated, said electrical heating means including a plurality of heating elements arranged in tandem in the direction of said outlet orifice, including a thermostat mounted in said central chamber intermediate said heating means and said outlet orifice, said thermostat having a make-and-break connection with a heating element outermost with respect to the outlet orifice, said nozzle having a plurality of projections for engaging a face of the object being treated to maintain the nozzle at a predetermined distance from said object, a lining of heat reflecting material being provided in said inner chamber surrounding said heating means.

LADDY F. BORDA.
SHELDON W. BILE.

REFERENCES CITED

The following references are of record in the file of this patent:

UNITED STATES PATENTS

| Number | Name | Date |
|---|---|---|
| 1,946,262 | Adams | Feb. 6, 1934 |
| 2,028,095 | Tully et al. | Jan. 14, 1936 |
| 2,049,812 | Loacker | Aug. 4, 1936 |
| 2,372,737 | Phillips | Apr. 3, 1945 |